United States Patent Office 3,501,492
Patented Mar. 17, 1970

3,501,492
PREPARATION OF BENZIMIDAZOLES
Douglas Floyd, Geelong, Victoria, Australia, assignor to Monsanto Chemicals (Australia) Limited, West Footscray, Victoria, Australia, a company of Australia
No Drawing. Filed Dec. 19, 1966, Ser. No. 602,510
Claims priority, application Australia, Mar. 21, 1966, 3,162/66
Int. Cl. C07d 49/38; C07c 87/58; A01n 9/22
U.S. Cl. 260—309.2     9 Claims

ABSTRACT OF THE DISCLOSURE

Process for the preparation of 2-trichloromethylbenzimidazoles which comprises reacting an appropriate o-phenylene-diamine with an alkyl trichloroacetimidate in the presence of an aliphatic monocarboxylic acid.

---

This invention relates to the preparation of 2-substituted benzimidazoles which are useful per se as biological toxicants, e.g. herbicides and anthelmintics, and as intermediates for the preparation of other 2-substituted benzimidazoles which are valuable biological toxicants, particularly anthelmintics.

United States Patent 3,325,508, filed Dec. 21, 1964 discloses the preparation of the new 2-trichloromethylbenzimidazoles of the formula:

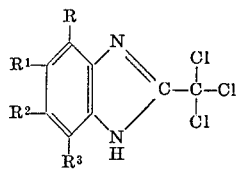

wherein R, R¹, R² and R³ are selected from the group consisting of hydrogen, halogen (Cl, Br, F and I) hydroxy, NO₂, NH₂, alkyl, alkoxy, haloalkyl, alkylthio, acyloxy, acylamino, alkylamino and dialkylamino of not more than 8 carbon atoms, by a process which comprises reacting a mono-salt of an appropriately substituted o-phenylenediamine with an alkyl trichloroacetimidate in the presence of a solvent, such as ethers or esters or alcohols, as illustrated in the following equation:

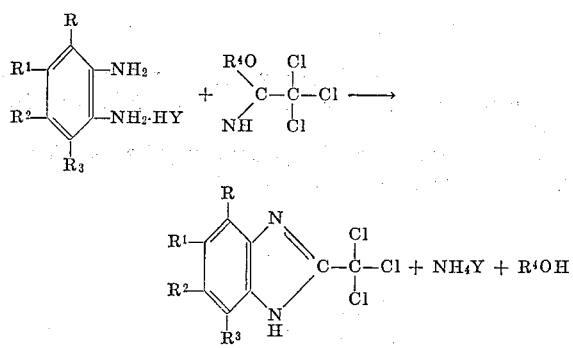

wherein R, R¹, R² and R³ are as defined above, Y denotes the radical of a mineral acid, preferably hydrochloric acid or sulphuric acid; and R⁴ is an alkyl group, preferably having fewer than five carbon atoms. Where one or more of R, R¹, R² and R³ is nitro, the mono-salt of o-phenylenediamine is reacted with an alkyl trichloroacetimidate to form 2-trichloromethylbenzimidazole which is then nitrated to form the desired nitro derivative. The halogen substituent or the halo portion of the haloalkyl substituent preferably is chlorine. The alkyl group or the alkyl portion of the alkoxy, acyloxy, alkylthio, haloalkyl, acylamino, alkylamino, or dialkylamino substituents can contain a maximum of 8 carbon atoms, and preferably have not more than 4 carbon atoms.

In accordance with this invention it has been found that 2-trichloromethylbenzimidazoles of the formula:

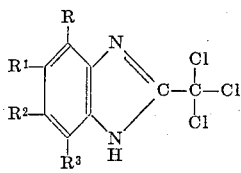

wherein R, R¹, R² and R³ are as defined above can be prepared by a process which comprises reacting an appropriate o-phenylenediamine with an alkyl trichloroacetimidate of the formula:

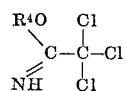

wherein R⁴ is as defined above, in an acidic reaction medium consisting essentially of an aliphatic monocarboxylic acid. The aliphatic monocarboxylic acid, which can be used without having other acid present, suitably contains from 1 to 5 carbon atoms, the preferred acid being formic acid or acetic acid.

In accordance with the process of the invention, the above 2-trichloromethylbenzimidazoles are prepared more simply and economically than when the method described in aforementioned United States Patent 3,225,508 is employed. The process of the present invention results in similar high yield of the desired reaction product but with improved color and greater purity, even when crude brown commercial o-phenylenediamines are used. The purity of 2-trichloromethylbenzimidazoles is economically important. Recrystallization to improve purity is difficult since the 2-trichloromethylbenzimidazoles are only slightly soluble in solvents with which they do not react. Impurities in 2-trichloromethylbenzimidazoles tend to transfer into derivatives such as azolin-2-yl-benzimidazoles, and since these derivatives generally are even more difficult to purify than the parent 2-trichloromethylbenzimidazoles, the need for purity of the parent compounds is critical. Another advanage of the present invention is that the mono-salts of the o-phenylenediamines are not required.

Reaction of the selected o-phenylenediamine and alkyl trichloroacetimidate in the presence of the aliphatic monocarboxylic acid is carried out in any convenient manner. According to a preferred procedure, the selected o-phenylenediamine component is stirred into the aliphatic monocarboxylic acid until dissolved or until a suspension is formed. The alkyl trichloroacetimidate is then slowly added to the mixture, which preferably is cooled at a rate suitable for adequate dissipation of liberated heat. The order of mixing the reactants appears not to effect the quality of the reaction product, however, as the alkyl trichloroacetimidate component tends to be unstable in acid medium, the preferred course is to add the alkyl trichloroacetimidate component to the selected o-phenylenediamine component dissolved or suspended in the aliphatic monocarboxylic acid solvent medium.

Purity of the selected o-phenylenediamine and alkyl trichloroacetimidate components is not critical, commercial grade materials being useable without adversely effecting the purity of the desired reaction product. The selected o-phenylenediamine and alkyl trichloroacetimidate components are reacted preferably in equimolar amounts in order to maintain a high purity level in the reaction mass, however, either reactant may be used in excess if desired.

The acidic reaction medium should contain at least 30 to 40 percent of aliphatic monocarboxylic acid by weight and preferably from about 80 to 100 percent acid by weight. Yields of 93% by weight were obtained with glacial acetic acid; yields of 90% by weight were obtained with 80% by weight acetic acid; and yields of 88% by weight were obtained with 40% by weight acetic acid. The amount of aliphatic monocarboxylic acid employed in the acid reaction medium preferably is at least 0.5 mole per mole of the o-phenylenediamine reactant, the practical consideration being the provision of a readily stirrable mass, and the avoidance of a mass which is unduly dilute due to a large excess of acid.

The temperature of the reaction varies with the nature of the nuclear substituents in the o-phenylenediamine component. Electron-donating substituent groups such as alkyl and alkoxy, favor the reaction, which occurs readily at temperatures from 0°–35° C., suitably from 15–25° C., when such groups are present, cooling being required in some cases, as the reaction is exothermic. On the other hand, electron-withdrawing groups, such as halogen, retard the reaction, temperatures from 30°–60° C., suitably from 40°–50° C., often being required in order to complete the reaction within a satisfactory period of time. Generally, the reaction time is short in duration, being in the order of a few minutes. However, the effective reaction time is increased by the slow addition of the alkyl trichloroacetimidate to the solution or suspension of the o-phenylenediamine component in the aliphatic monocarboxylic acid medium, the slow addition being desirable so as to avoid generation of excessive heat and incidentally reduce decomposition of the alkyl trichloroacetimidate component in the acid medium.

The desired end product usually precipitates from the reaction mass, and is readily isolated therefrom. Any necessary purification can be effected by conventional procedures.

The following examples will illustrate the invention. In these examples, as well as in the specification and appended claims, parts and percent are by weight unless otherwise indicated.

EXAMPLE 1

Glacial acetic acid (50 mls.) and o-phenylenediamine (10.8 g., 0.1 mole) were stirred in a flask at 20° C., until dissolved. Methyl trichloroacetimidate (17.65 g., 0.1 mole) was added to the cooled solution over 1 hour at 10°–20° C. The mixture was stirred for ½ hour at 10°–20° C. The solid 2-trichloromethylbenzimidazole was filtered and washed with water until the filtrate was clear. The product was dried in an air oven at 75° C., to give 21.94 (93%) of white crystalline material with the correct I.R. spectrum.

EXAMPLE 2 o-Phenylenediamine (10–80 g., 0.1 mole) was dissolved in 50 mls. of cold 80% w./w. aqueous acetic acid. Methyl trichloroacetimidate (18.00 g., 0.11 mole) was added over ½ hour at 20° C., and the mixture was held at that temperature for a further ½ hour. The solid 2-trichloromethylbenzimidazole was filtered and washed with water, until the filtrate was clear. The product was dried in an air oven at 75° C., to yield 21.10 g. (90%) of crystalline off-white material with the correct I.R. spectrum.

EXAMPLE 3

Example 1 was repeated using 50 mls. of 40% w./w. aqueous acetic acid and a temperature of 20°–30° C., to give 20.65 g. (88%) of product with the correct I.R. spectrum.

EXAMPLE 4

Example 1 was repeated using 50 mls. of 90% w./w. formic acid to give 21.36 g. (91%) of product with correct I.R. spectrum.

Following substantially the same procedure as in Example 1 above the following compounds of the above formula are prepared.

Example:
5  2-trichloromethyl-5-methylbenzimidazole
6  2-trichloromethyl-5,6-dimethylbenzimidazole
7  2-trichloromethyl-5-methoxybenzimidazole
8  2-trichloromethyl-5-chlorobenzimidazole
9  2-trichloromethyl-5-bromobenzimidazole
10 2-trichloromethyl-5,6-dichlorobenzimidazole
11 2-trichloromethyl-5-methylthiobenzimidazole
12 2-trichloromethyl-5-chloromethylbenzimidazole
13 2-trichloromethyl-5-nitrobenzimidazole
14 2-trichloromethyl-5-aminobenzimidazole
15 2-trichloromethyl-5-acetylaminobenzimidazole
16 2-trichloromethyl-5-methylaminobenzimidazole
17 2-trichloromethyl-5-dimethylaminobenzimidazole
18 2-trichloromethyl-4-fluorobenzimidazole
19 2-trichloromethyl-4,7-difluorobenzimidazole
20 2-trichloromethyl-4-iodobenzimidazole
21 2-trichloromethyl-4-hydroxybenzimidazole
22 2-trichloromethyl-5,6-dihydroxybenzimidazole
23 2-trichloromethyl-5-acetoxybenzimidazole
24 2-trichloromethyl-4,7-dioctylbenzimidazole
25 2-trichloromethyl-5-heptylbenzimidazole
26 2-trichloromethyl-4,7-dioctylthiobenzimidazole
27 2-trichloromethyl-5-iodobutylbenzimidazole
28 2-trichloromethyl-5-fluoroethylbenzimidazole
29 2-trichloromethyl-4-bromohexylbenzimidazole
30 2-trichloromethyl-4,7-di(acetylamino)-benzimidazole
31 2-trichloromethyl-5-dibutylaminobenzimidazole
32 2-trichloromethyl-5,6-di(dibutylamino)-benzimidazole
33 2-trichloromethyl-4,7-di(octylamino)-benzimidazole
34 2-trichloromethyl-4,5,6,7-tetrahydroxybenzimidazole
35 2-trichloromethyl-4,5,6,7-tetramethylbenzimidazole
36 2-trichloromethyl-4,5,6,7-tetrachlorobenzimidazole The embodiments of the invention in which an exclusive property or privilege is claimed are defined as follows:

1. In a process for the preparation of a 2-trichloromethylbenzimidazole of the formula

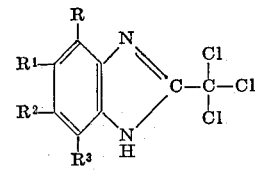

wherein R, $R^1$, $R^2$ and $R^3$ are each selected from the group consisting of hydrogen, halogen, OH, $NH_2$, $NO_2$, alkyl, alkoxy, haloalkyl, alkylthio, alkanolyoxy, alkanoylamino, alkylamino, and dialkylamino, said alkyl and alkanoyl portions of said substituents each being of not more than 8 carbon atoms, by reacting a compound of the formula

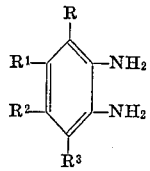

with an alkyl trichloroacetimidate of the formula

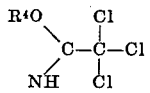

wherein $R^4$ is alkyl of not more than 4 carbon atoms, in the presence of a liquid reaction medium, the improvement which comprises carrying out the process in the presence of a liquid reaction medium consisting essentially of an aliphatic monocarboxylic acid of the formula $C_nH_{2n+1}COOH$ wherein $n$ is an integer from 0 to 4, inclusive.

2. The process of claim 1 wherein the aliphatic monocarboxylic acid is formic acid.

3. Process of claim 1 wherein the aliphatic monocarboxylic acid as acetic acid.

4. Process of claim 1 wherein the reaction medium contains at least 30 percent by weight of aliphatic monocarboxylic acid.

5. Process of claim 1 wherein the reaction medium contains at least 80 percent by weight of aliphatic monocarboxylic acid.

6. Process of claim 1 wherein the o-phenylenediamine and alkyl trichloroacetimidate reactants are in approximately equimolar amounts, and the amount of aliphatic monocarboxylic acid is at least 0.5 mol per mole of the o-phenylenediamine reactant.

7. Process of claim 1 wherein R, $R^2$ and $R^3$ are hydrogen.

8. Process of claim 1 wherein R and $R^3$ are hydrogen.

9. Process of claim 1 wherein the 2-trichloromethylbenzimidazole is selected from the group consisting of 2-trichloromethylbenzimidazole;
2-trichloromethyl-5-methylbenzimidazole;
2-trichloromethyl-5,6-dimethylbenzimidazole;
2-trichloromethyl-5-methoxybenzimidazole;
2-trichloromethyl-5-chlorobenzimidazole;
2-trichloromethyl-5-bromobenzimidazole;
2-trichloromethyl-5,6-dichlorobenzimidazole;
2-trichloromethyl-5-methyl thiobenzimidazole;
2-trichloromethyl-5-chloromethylbenzimidazole;
2-trichloromethyl-5-nitrobenzimidazole;
2-trichloromethyl-5-aminobenzimidazole;
2-trichloromethyl-5-acetylaminobenzimidazole;
2-trichloromethyl-5-methylaminobenzimidazole;
and 2-trichloromethyl-5-dimethylaminobenzimidazole.

References Cited

UNITED STATES PATENTS

| 2,935,514 | 5/1960 | Hoffmann et al. | 260—309.2 |
| 2,942,002 | 6/1960 | Hoffmann et al. | 260—309.2 |
| 2,945,043 | 7/1960 | Hoffmann et al. | 260—309.2 |
| 3,325,508 | 6/1967 | Samuel et al. | 260—309.2 |

OTHER REFERENCES

Netherlands Application 6414890 (124 hb 3b) August 1965, 260–309.2, 11 page spec., 1 page drawing.

HENRY R. JILES, Primary Examiner

N. TROUSOF, Assistant Examiner

U.S. Cl. X.R.

71—92; 260—453, 575, 578, 999